United States Patent
Penna et al.

(10) Patent No.: US 12,278,717 B2
(45) Date of Patent: Apr. 15, 2025

(54) DATA-AIDED CHANNEL TRACKING FOR OFDM SYSTEMS

(71) Applicant: Samsung Electronics Co., Ltd., Gyeonggi-do (KR)

(72) Inventors: Federico Penna, San Diego, CA (US); Hongbing Cheng, San Diego, CA (US)

(73) Assignee: Samsung Electronics Co. Ltd (KR)

( * ) Notice: Subject to any disclaimer, the term of this patent is extended or adjusted under 35 U.S.C. 154(b) by 31 days.

(21) Appl. No.: 18/141,178

(22) Filed: Apr. 28, 2023

(65) Prior Publication Data

US 2024/0267262 A1   Aug. 8, 2024

Related U.S. Application Data

(60) Provisional application No. 63/443,126, filed on Feb. 3, 2023.

(51) Int. Cl.
*H04L 27/28* (2006.01)
*H04L 25/02* (2006.01)

(52) U.S. Cl.
CPC ...... *H04L 25/0236* (2013.01); *H04L 25/0214* (2013.01); *H04L 25/0222* (2013.01)

(58) Field of Classification Search
CPC .. H04B 7/0854; H04B 7/0452; H04B 7/0617; H04L 5/0007; H04L 25/0224; H04L 25/024; H04W 24/02; H04W 56/0035
USPC .......................................... 375/260, 262, 267
See application file for complete search history.

(56) References Cited

U.S. PATENT DOCUMENTS

| | | | |
|---|---|---|---|
| 8,000,399 B2 | 8/2011 | Patel et al. | |
| 9,698,941 B2 | 7/2017 | Vojcic et al. | |
| 2004/0264561 A1* | 12/2004 | Alexander | H04L 27/2662 375/232 |
| 2009/0196333 A1* | 8/2009 | Cozzo | H04L 25/0204 375/225 |
| 2010/0098146 A1 | 4/2010 | Kim et al. | |
| 2018/0183647 A1* | 6/2018 | Monin | H04L 25/0224 |
| 2022/0200825 A1 | 6/2022 | Kleinerman et al. | |
| 2022/0231887 A1 | 7/2022 | Zhang et al. | |

FOREIGN PATENT DOCUMENTS

CN   104869083   5/2018

OTHER PUBLICATIONS

Chen, Wei et al., "Estimation of Time and Frequency Selective Channels in OFDM Systems: A Kalman Filter Structure", IEEE Communications Society, Globecom 2004, pp. 4.

* cited by examiner

*Primary Examiner* — Khai Tran
(74) *Attorney, Agent, or Firm* — The Farrell Law Firm, P.C.

(57) ABSTRACT

A system and a method are disclosed for performing data-aided channel tracking for a subcarrier, including obtaining a reference channel estimate (CE) at a first time instance using a reference signal; determining, based on the obtained reference CE and based on received data symbols, a data-aided CE at a second time instance that is subsequent to the first time instance; and sequentially determining one or more additional data-aided CEs, for one or more time instances subsequent to the second time instance, based on a data-aided CE obtained at a previous time instance and based on the received data symbols.

20 Claims, 5 Drawing Sheets

DATA-AIDED CHANNEL TRACKING FOR OFDM SYSTEMS

CROSS-REFERENCE TO RELATED APPLICATION

This application claims the priority benefit under 35 U.S.C. § 119(e) of U.S. Provisional Application No. 63/443,126, filed on Feb. 3, 2023, the disclosure of which is incorporated by reference in its entirety as if fully set forth herein.

TECHNICAL FIELD

The disclosure generally relates to channel estimation (CE) in wireless communication systems based on OFDM. More particularly, the subject matter disclosed herein relates to improvements to user equipment (UE) side downlink CE in wireless communication systems based on OFDM.

SUMMARY

In fifth generation (5G) new radio (NR) and other orthogonal frequency division multiplexing (OFDM) systems, channel estimation (CE) is an important step in the receiver operation. CE helps the receiver detect symbols and reconstruct transmitted data. CE may be performed using pilot symbols, which are sent at specific time-frequency locations in the OFDM grid. In 5G NR, these pilot symbols are called demodulation reference signals (DMRSs).

The receiver may estimate the channel at pilot locations and then, by performing interpolation in the frequency and/or time domain, estimate the channel in other resource elements (RE) where data symbols are transmitted. However, time-domain interpolation (TDI) is only possible if DMRS is allocated on at least 2 OFDM symbols within a slot (otherwise, time interpolation is reduced to a scalar coefficient). If a single DMRS symbol is configured at the beginning of the slot (e.g., for 5G NR systems, this may be for frequency range 2 (FR2)), TDI may not be possible, and the receiver may be limited to using a scaled version of the channel value estimated at the beginning of the slot for all the subsequent OFDM symbols in the slot.

This approach is only suitable for scenarios characterized by slow channel variation in time, i.e., low-Doppler frequency. In principle, the next generation node B (gNB) should configure a single front-loaded DMRS only in low-Doppler scenarios. However, in practice, sometimes the gNB may configure a single front-loaded DMRS even in high-Doppler scenarios, due to factors like infrequent Doppler estimation or abrupt changes in UE speed.

To solve this problem, channel tracking techniques are proposed that do not rely on multiple pilot symbols. These techniques can also be extended to inter-slot channel tracking if similar precoding is used by the gNB across multiple slots. This is because the estimated channel from DMRS is a precoded channel, which includes the precoding applied by the gNB.

Data-aided channel tracking techniques are provided herein that, given an initial channel estimate (for example, obtained by a front-loaded DMRS pilot), update the estimated channel value for subsequent OFDM symbols within a slot (or across multiple slots, if the precoding matrix applied by the base station does not change).

The proposed embodiments may leverage reconstructed data symbols from a payload (for example, physical downlink shared channel (PDSCH) symbols in 5G NR systems) for improving CE quality.

The reconstructed data symbols at a given OFDM symbol (e.g., symbol l) may be obtained from the log-likelihood ratios (LLRs) after symbol detection or decoding, and used by the CE block to improve the channel estimate at the next time instance (symbol l+1). The proposed architecture does not require a feedback loop, which is beneficial for implementation because it does not introduce a significant processing delay. In addition, embodiments of the present disclosure may re-use a given OFDM symbol (e.g., symbol l) on preceding symbols, and apply refined CEs based on the given OFDM symbol to succeeding OFDM symbols.

The channel estimate may be updated at each OFDM symbol by a linear filter such as an infinite impulse response (IIR) filter and a Kalman filter (KF).

The above approaches improve on previous methods because they enhance CE performance, especially when a single front-loaded DMRS is configured by the gNB and the Doppler frequency is relatively high. In addition, by using symbol reconstruction and filtering operations, compared to other data-aided channel estimation enhancements such as iterative CE, complexity and latency are reduced because a feedback loop does not need to be used.

In an embodiment, a method includes obtaining a reference CE at a first time instance using a reference signal; determining, based on the obtained reference CE and based on received data symbols, a data-aided CE at a second time instance that is subsequent to the first time instance; and sequentially determining one or more additional data-aided CEs, for one or more time instances subsequent to the second time instance, based on a data-aided CE obtained at a previous time instance and based on the received data symbols.

In an embodiment, an electronic device includes at least one processor; and at least one memory operatively connected with the at least one processor. The at least one memory storing instructions, which when executed, instruct the at least one processor to perform a method of performing data-aided channel tracking for a subcarrier, by obtaining a reference CE at a first time instance using a reference signal; determining, based on the obtained reference CE and based on received data symbols, a data-aided CE at a second time instance that is subsequent to the first time instance; and sequentially determining one or more additional data-aided CEs, for one or more time instances subsequent to the second time instance, based on a data-aided CE obtained at a previous time instance and based on the received data symbols.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
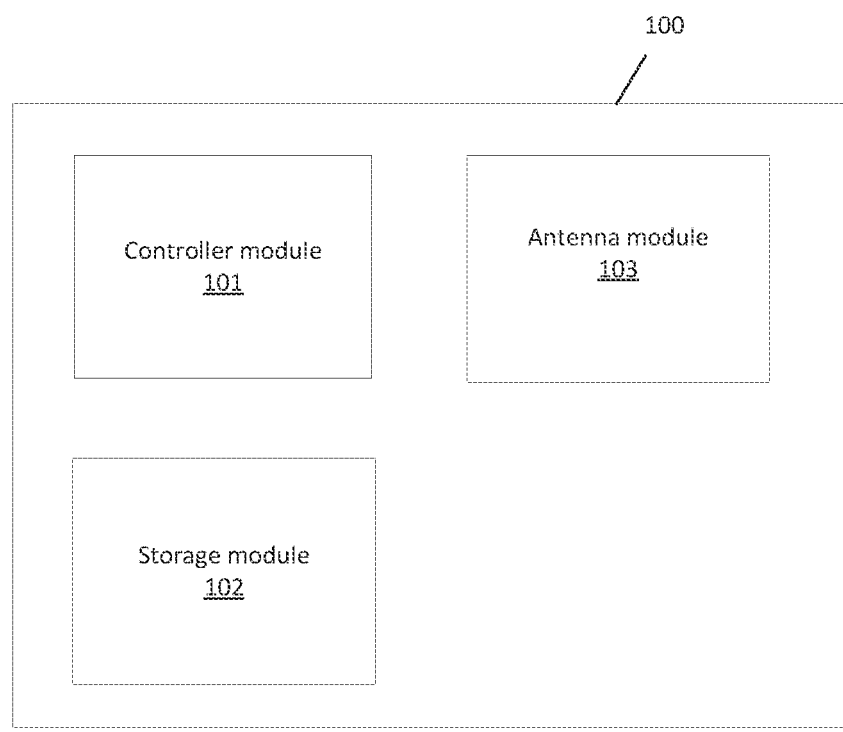
FIG. 1 is a receiver in an OFDM communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

"CE" as used herein refers to the process of estimating the characteristics of a communication channel between a transmitter and a receiver.

In wireless communication, transmitted signals undergo various types of distortions such as attenuation, phase shift, and multipath fading due to the characteristics of the wireless channel. CE techniques aim to estimate these distortions to allow a receiver to compensate for them to extract a transmitted signal.

FIG. 1 illustrates a receiver in an OFDM communication system, according to an embodiment.

Referring to FIG. 1, the receiver 100 may be a UE receiver or a client receiver and includes a controller module 101, a storage module 102, and an antenna module 103. The UE receiver may be a downlink receiver.

The controller module 101, storage module 102, and antenna module 103 may be structural components to facilitate efficient and accurate reception of a downlink signal from a base station.

The controller module 101 may include at least one processor and may execute instructions that are stored in the storage module 102. For example, the controller module 101 may execute instructions for performing data-aided tracking techniques described herein. In addition, the controller module 101 may include a digital signal processor (DSP) for performing signal processing on a signal. The DSP may include one or more processing modules for functions such as synchronization, CE, equalization, and demodulation. The processing modules may be implemented using one or more DSP techniques, such as fast Fourier transform (FFT), inverse FFT (IFFT), and digital filtering. Additionally or alternatively, the controller module 101 may include an application processor for running user applications on the receiver, such as web browsers, video players, and other software applications. The application processor may include one or more processing units, memory devices, and input/output interfaces.

The storage module 102 may include transitory or non-transitory memory storing instructions that, when executed, cause the controller module 101 to perform steps to execute data-aided tracking techniques described herein. In addition, the storage module 102 may include a protocol stack for implementing communication protocols used in the OFDM communication system. The protocol stack may include one or more layers, such as a physical layer, a medium access control (MAC) layer, a radio link control (RLC) layer, and a packet data convergence protocol (PDCP) layer.

The antenna module 103 may include one or more antennas for wirelessly transmitting and receiving signals to a base station or another device. For example, the antenna module may receive an OFDM signal transmitted by a base station and convert it into an electrical signal.

The receiver 100 may be a receiver of an OFDM-based communication system (e.g., the UE in a 5G NR system) in downlink, i.e., the UE receives and demodulates data transmitted by the gNB. In addition, the receiver 100 may also transmit a signal via the antenna module 103 and, therefore, may be a transmitter.

In an OFDM system, resource elements (REs) are arranged in a grid, known as an OFDM grid. The grid is typically two-dimensional, with one axis representing frequency and the other axis representing time. Subcarriers occupy specific frequencies and OFDM symbols occupy specific time symbols (time instances) within the grid.

The OFDM grid allows multiple users to transmit data simultaneously over the same frequency band, with each user being assigned a subset of the REs in the grid. It also provides robustness against frequency-selective fading, which is when certain frequency bands experience more attenuation than others due to signal interference or other factors.

The OFDM grid enables the transmission of pilot symbols for CE, which are used to estimate channel characteristics. The pilot symbols are transmitted on a subset of the subcarriers in the grid and may be both the transmitter and the receiver.

During CE, the receiver uses the received pilot symbols to estimate the channel characteristics at the pilot subcarrier frequencies. It then uses this information to interpolate or extrapolate the channel characteristics for the non-pilot subcarriers in the grid. This allows the receiver to equalize the received signal and decode the transmitted data.

An RE is identified by a time-frequency index pair (k,l), where k is the subcarrier index and l is the OFDM symbol index. In NR, one slot includes 14 OFDM symbols. DMRS may be configured by the gNB on one or more (e.g., up to 4) symbols per slot, and/or with different frequency patterns.

The present application considers the case in which DMRS is configured on a single OFDM symbol in a slot. Such symbol is denoted by $l_1$. When a single DMRS is configured in NR, it's typically located at the beginning of the slot (e.g., $l_1=3$) and for this reason it's sometimes called a "front-loaded DMRS".

The present application can also be applied when multiple DMRS symbols are used as well, although the performance gain may be less significant in that case.

Figure 2:
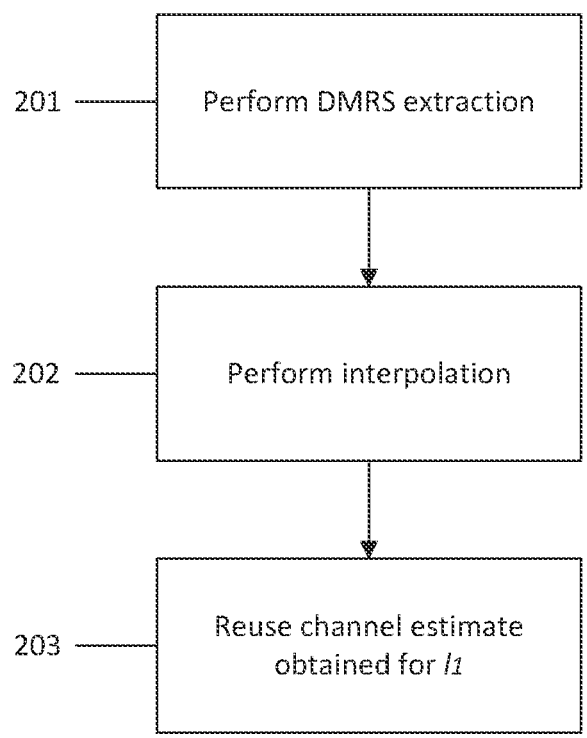
FIG. 2 is a flowchart illustrating a method of performing CE, according to an embodiment.

FIG. 2 is a flowchart illustrating a method of performing CE, according to an embodiment.

Referring to FIG. 2, DMRS extraction is performed in step 201. DMRS extraction may be performed on symbol $l_1$ and all subcarriers where a DMRS is allocated. Then in step 202, interpolation is performed. The interpolation that is performed may be a type of interpolation (e.g., linear or frequency domain (FD)-minimum mean squared error (MMSE)) to obtain channel estimates on the remaining subcarriers for symbol $l_1$. The channel estimate obtained in this way may be denoted by $\hat{h}_f(k,l_1)$, for symbol $l_1$ and for a certain subcarrier k. Next, in step 203, the channel estimate obtained for symbol $l_1$ is reused (up to a scalar factor c (a rescaling coefficient)) on every other symbol in the slot if DMRS is present on symbol $l_1$ only since time-domain interpolation reduces to a scalar factor c. Mathematically, this may be represented by Equation 1:

$$\hat{h}(k, l) = c \cdot \hat{h}_f(k, l_1) \quad \text{Equation 1}$$

for all l in the slot (e.g., l∈{1, 2, . . . , 14}).

The present application proposes reusing the estimates obtained on symbol $l_1$ for the symbols before $l_1$, as shown below in Equation 2:

$$\hat{h}(k, l) = c \cdot \hat{h}_f(k, l_1) \quad \text{Equation 2}$$

for all l<$l_1$.

However, for subsequent symbols l>$l_1$, the present application proposes refining channel estimates by applying channel reconstruction, smoothing, and tracking, as described below with reference to FIG. 3.

Figure 3:
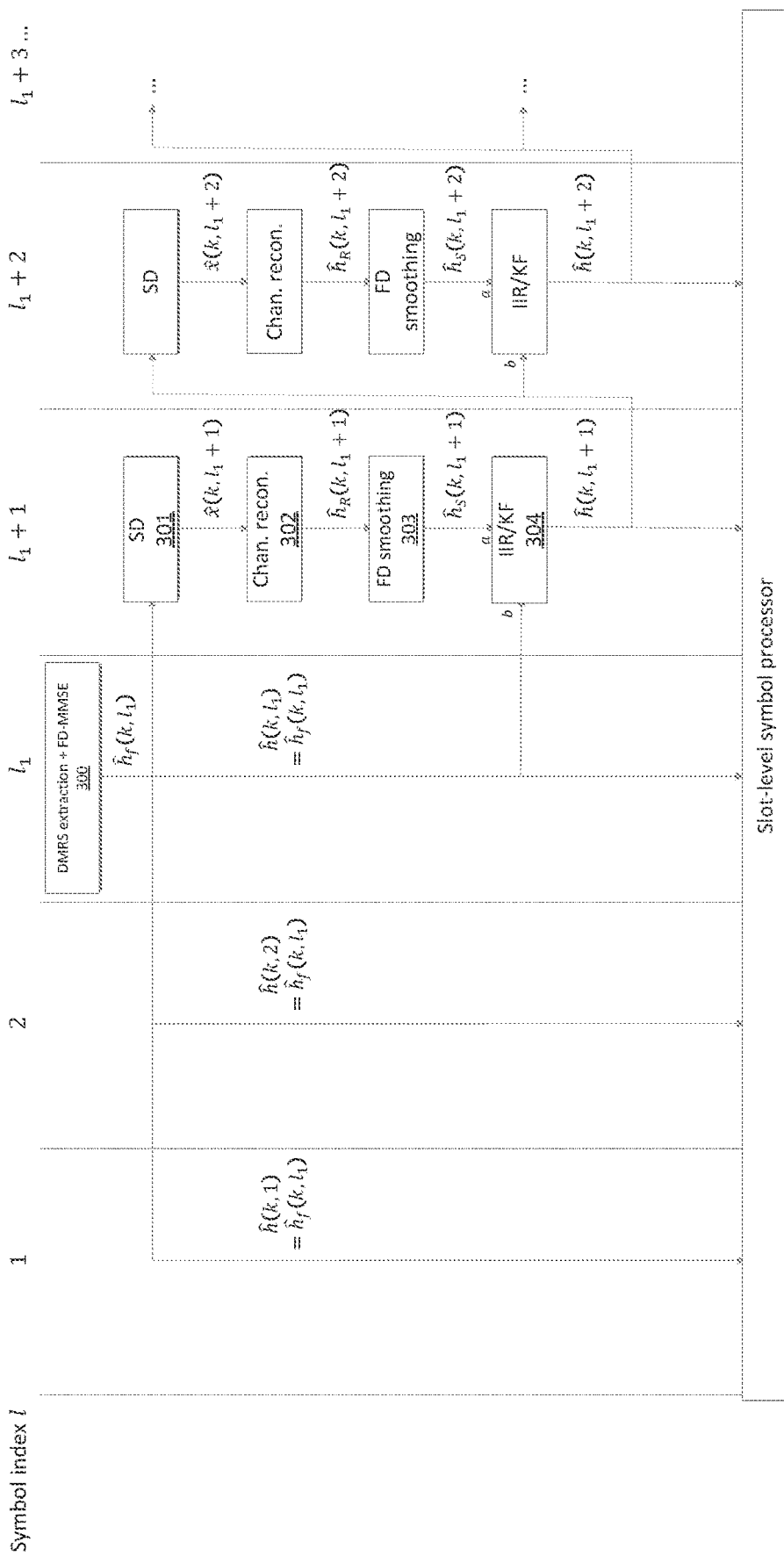
FIG. 3 is a block diagram illustrating refining a channel estimate given a first time symbol for a second time symbol, according to embodiment.

FIG. 3 is a block diagram illustrating refining a channel estimate using a first time symbol for a second time symbol, according to embodiment.

Referring to FIG. 3, for each symbol l>$l_1$, the algorithm performs steps 301-304. As shown in FIG. 3, the symbol index takes increasing values from 1 to $l_1$, $l_1$+1, $l_1$+2, etc. It should be understood that FIG. 3 shows $l_1$=3 just as an example. Other values of $l_1$ may be used. For instance, $l_1$ could be 1, 4, or other values, and the symbol index may take increasing values from 1 to $l_1$, $l_1$+1, $l_1$+2, etc. In addition, in FIG. 3, there are two symbols before $l_1$ (1 and 2) and there are a plurality of symbols after $l_1$ ($l_1$+1, $l_1$+2, $l_1$+3, etc.), however more or less symbols before or after $l_1$ are possible. In particular, a relatively large number of symbols may exist after $l_1$. Additionally, the number of symbols before $l_1$ could be different than the number of symbols after $l_1$. The subsequent description is made with respect to each subcarrier k in the bandwidth part, for which CE should be performed.

In step 300, DMRS extraction and FD-MMSE are performed for symbol $l_1$. Here in FIG. 3, $l_1$ is the front-loaded symbol. DMRS extraction and FD-MMSE generate an interpolated signal that is passed to the next symbol $l_1$+1 in the forward direction or $l_1$−1 in the backward direction. FIG. 3 illustrates passing in the forward direction, however passing in the backward direction may be performed when a small amount of latency is acceptable (e.g., when there is less than a predetermined amount of latency).

In step 301, data symbol recovery is performed with the symbol detector (SD). Using the previous channel estimate $\hat{h}(k,l-1)$ and the LLR from the SD or decoder output, a data symbol estimate $\hat{x}(k,l)$ may be obtained in step 301. The data symbol estimate $\hat{x}(k,l)$ is a hard (quantized) estimate of the transmitted signal. However, in principle a hard estimate or a soft (not quantized) estimate can be determined in step 301.

In step 302, channel reconstruction is performed. A reconstructed channel may be calculated based on Equation 3:

$$\hat{h}_R(k, l) = \frac{y(k, l)}{\hat{x}(k, l)} \qquad \text{Equation 3}$$

where y(k,l) is the received signal, e.g., from the FFT buffer, on subcarrier k and symbol l.

In step 303, frequency domain smoothing is performed to reduce variance of the signal per subcarrier. A smoothing filter (e.g., an FD-MMSE filter) may be applied to the reconstructed channel $\hat{h}_R(k,l)$, to obtain a "smoothed" version of the estimated channel, which is denoted by the scalar value of $\hat{h}_S(k,l)$. The smoothing filter may include vectors and/or matrices, which are denoted in bold (e.g., D(k,l)). Smoothing may be used to account for variations of the channel in the frequency domain by considering values at subcarriers before and/or after a given subcarrier.

According to an embodiment, if the FD-MMSE filter has 6 taps (or elements), the MMSE coefficients may be determined by taking 5 neighboring subcarriers and the subcarrier k itself. Mathematically, this can be based on Equations 4 and 5:

$$\hat{h}_S(k, l) = R_{h(k,l),h(k,l)}(R_{h(k,l),h(k,l)} + D(k, l))^{-1} \hat{h}_{R(k,l)} \qquad \text{Equation 4}$$

with $$D(k, l) = \text{diag}\left(\frac{\sigma^2}{|\hat{x}(k_0, l)|^2}, \ldots, \frac{\sigma^2}{|\hat{x}(k_0 + 5, l)|^2}\right) \qquad \text{Equation 5}$$

where $k_0=k-3$ for non-edge subcarriers ($k_0=0$ for subcarriers 0, 1, 2, and $k_0=N_{SC}-6$ for subcarriers $N_{SC}-1$, $N_{SC}-2$, where $N_{SC}$ is the number of subcarriers in the bandwidth part (e.g., for a predetermined frequency range)), $h(k,l)=[h(k_0,l), \ldots, h(k_0+5,l)]T$, $\hat{h}_R(k,l)=[\hat{h}_R(k_0,l), \ldots, \hat{h}_R(k_0+5,l)]^T$, $R_{x,y}=E[xy^H]$, and $\sigma^2$ is the inverse of the SNR.

Although 6 taps are shown above with respect to Equations 4-5 (e.g., $k_0$, $k_0+1$, $k_0+2$, $k_0+3$, $k_0+4$, and $k_0+5$), any number of taps can be used in accordance with embodiments of the present disclosure.

"Edge subcarriers" may be near the beginning or the end of the bandwidth part, or the frequency range considered for CE.

A simplified FD-MMSE filter can be obtained based on Equation 6:

$$D(k, l) = \sigma^2 I \qquad \text{Equation 6}$$

By using Equation 6, the complexity of the system may be reduced because the matrix inverse can be pre-computed instead of a computation being performed for each subcarrier k (because $k_0$, $k_0+1$, $k_0+2$, $k_0+3$, $k_0+4$, and $k_0+5$, and hence the expression of D(k,l), vary as a function of k). In addition, a noise variance can also be adjusted by inserting a coefficient β optimized by simulation (e.g., $D(k,l)=\beta\sigma^2 I$).

In step 304, time domain filtering (channel tracking) is performed to obtain the final filtered channel estimate at symbol l by a linear filter using, for example, IIR or a KF. Accordingly, a time domain filtering value may be estimated in step 304, and used for data symbol recovery (step 301) and filtering (step 304) in the next symbol (l+1). A discrete linear filter of order 2 (i.e., a filter having a memory of 1 symbol in the past) can be expressed according to Equation 7:

$$\hat{h}(k, l) = a\hat{h}_S(k, l) + b\hat{h}(k, l-1) \qquad \text{Equation 7}$$

where a and b are two linear coefficients. As shown above and in FIG. 3, a may be a coefficient that is applied to an estimate obtained at a given symbol index l, and b may be a feedback coefficient applied to an estimate obtained at a previous symbol index l−1. Examples of a and b are provided below for the cases of IIR and KFs.

Steps 301-304 may be repeated for symbol l+1, l+2, and so on until the end of the slot (or the considered CE time interval). Additionally or alternatively, steps 301-304 may be performed in the backwards direction along the symbol index l ($l<l_1$). Filtering in the backwards direction may be done when a marginal amount of latency in the system can be tolerated.

Once all the channel estimates have been obtained for all the symbols in the slot, they are delivered to a slot-level symbol processor for the final symbol detection. In this manner, a refined CE obtained in step 304 may be applied to a demodulation SD at a subsequent OFDM symbol. Additionally, the proposed technique does not necessarily require a feedback loop since refined CEs are applied to subsequent OFDM symbols, which reduces a processing delay. Although a feedback loop may be used in combination with embodiments of the present disclosure (e.g., by applying a refined CE to prior OFDM symbols to improve CE estimation), the present disclosure advances the notion of applying refined CEs to subsequent OFDM symbols (in the forward direction).

For time filtering described in step 304, two filtering options are proposed. Option 1 is an IIR filter and option 2 is a KF. Additional time filtering operations may be used without departing from the scopes of embodiments discloses herein.

Using an IIR filter (option 1) may be a less complex option than using a KF (option 2).

If an IIR filter is used, the coefficients a and b may be described according to Equations 8-9:

$$a = \alpha, b = 1 - \alpha \qquad \text{Equations 8, 9}$$

for some $\alpha \in (0,1)$.

Accordingly, $\hat{h}(k,l) = a\hat{h}_S(k,l) + b\hat{h}(k,l-1)$ may be restated as Equation 10:

$$\hat{h}(k, l) = \alpha\hat{h}_S(k, l) + (1 - \alpha)\hat{h}(k, l-1) \qquad \text{Equation 10}$$

Additionally or alternatively, a more advanced option for time filtering (e.g., KF) can be used.

A KF model may include two routines—the observation routine and the state evolution routine—which may be respectively defined according to Equations 11 and 12:

$$\hat{h}_S(k, l) = h(k, l) + \varepsilon(k, l) \quad \text{Equation 11}$$

$$h(k, l) = fh(k, l-1) + v(k, l-1) \quad \text{Equation 12}$$

where $\varepsilon(k,l) \sim N(0, \sigma_\varepsilon^2(k,l))$ and $v(k,l) \sim N(0,Q)$.

To derive a KF update rule, the terms $\sigma_\varepsilon^2(k,l)$ may represent the "observation noise variance" as a function of k and l due to variance for different REs, and Q, which represents the "state evolution variance".

The observation noise variance $\sigma_\varepsilon^2(k,l)$ can be expressed analytically since $\hat{h}_S(k,l)$ is determined by FD-MMSE. Using MMSE properties, Equation 13 can be deduced:

$$\sigma_\varepsilon^2(k, l) = 1 - R_{h(k,l),h(k,l)}(R_{h(k,l),h(k,l)} + D(k, l))^{-1} R_{h(k,l),h(k,l)}^H \quad \text{Equation 13}$$

where the channel power is assumed to be unitary.

The state evolution parameters f and Q can be derived from Yule-Walker (YW) equations for a first-order autoregressive process (e.g., an AR(1,1) process) to obtain Equations 14-15:

$$f = r_t(1) \quad \text{Equation 14}$$

$$Q = 1 - r_t(1)^2 \quad \text{Equation 15}$$

where $r_t(d)$ is a time correlation function calculated at a distance of d OFDM symbols (e.g., calculated using Jakes' model). Additionally, other well-known ways to optimize the value of f may be used irrespective of the time correlation.

For f=1 and Q=0, the KF may be reduced to a sequential linear MMSE (LMMSE) filter which assumes the unknown variable h(k,l) to be the same for all symbols l.

The Kalman variance P(k,l) for the initial symbol $l=l_1$ may be set based on Equation 16:

$$P(k, l_1) = \sigma_e^2 \quad \text{Equation 16}$$

where $\sigma_e^2$ is the estimation error at the DMRS symbol, averaged over all subcarriers, which may be a CE parameter and can be determined analytically from the properties of the interpolator (e.g., an FD-MMSE interpolator or any other interpolation/denoising technique) used in the CE.

The KF update rule (i.e., the proposed channel tracking algorithm) may be provided by Equations 17-19:

$$\hat{h}(k, l) = K(k, l)\hat{h}_S(k, l) + (1 - K(k, l))f\hat{h}(k, l-1) \quad \text{Equation 17}$$

where $$K(k, l) = \frac{f^2 P(k, l-1) + Q}{f^2 P(k, l-1) + Q + \sigma_\varepsilon^2(k, l)} \quad \text{Equation 18}$$

is the Kalman gain. The Kalman variance is updated as Equation 19:

$$P(k, l) = (1 - K(k, l))(f^2 P(k, l-1) + Q) \quad \text{Equation 19}$$

Thus, with reference to the general filtering equation ($\hat{h}(k,l) = a\,\hat{h}_S(k,l) + b\,\hat{h}(k,l-1)$), coefficients a and b are given by Equations 20-21:

$$a = K(k, l) \quad \text{Equation 20}$$

$$b = 1 - K(k, l) \quad \text{Equation 21}$$

However, the coefficients a and b may be different for different REs (as functions of k,l), and the Kalman gain K may vary at each OFDM symbol, as an effect of the updated P(k,l).

The steps described in FIG. 3 may be performed by one or more of the structural components of the transmitter or receiver 100, the electronic device 501, the electronic device 502, or the electronic device 504. In addition, the steps shown may encompass a subroutine that is performed by the controller module 101. Information including the steps may be stored in the storage module 102, and the steps may be executed by the controller module 101. In addition, the steps may be similarly performed by the electronic device 501, the processor 520, and the memory 530.

For complexity reduction, the channel may be updated, not for every OFDM symbol, but only for some predefined period of symbols. This process may be referred to as "symbol skipping". For example, the channel may be updated every 2 or every 3 symbols.

If $\mathcal{T}$ is a set of symbols selected for channel tracking, then the channel update equations may be modified as shown in Equations 22 and 23:

$$\hat{h}(k, l) = \begin{cases} \alpha \hat{h}_S(k, l) + (1-\alpha)\hat{h}(k, l-1) & \text{if } l \in \mathcal{T} \\ \hat{h}(k, l-1) & \text{otherwise} \end{cases} \quad \text{Equation 22}$$

$$\hat{h}(k, l) = \begin{cases} K(k, l)\hat{h}_S(k, l) + (1-K(k, l))f\hat{h}(k, l-1) & \text{if } l \in \mathcal{T} \\ \hat{h}(k, l-1) & \text{otherwise} \end{cases} \quad \text{Equation 23}$$

In the case of symbol skipping, KF coefficients f and K(k,l) should be modified according to the inter-symbol distance $\Delta$. Specifically, correlation-dependent parameters f and Q may be restated as shown below in Equations 24 and 25:

$$f = r_t(\Delta) \quad \text{Equation 24}$$

$$Q = 1 - r_t(\Delta)^2 \quad \text{Equation 25}$$

For an IIR filter, the coefficient $\alpha$ may be optimized by numerical simulations as a function of $\Delta$ as well as the Doppler frequency.

In the case of multi-layer communication, a successive interference cancellation (SIC) scheme may be adopted for CE of multiple layers. For example, in the case of two spatial streams, the received signal model can be written based on Equations 26-27:

$$y_1(k, l) = h_{11}(k, l)x_1(k, l) + h_{12}(k, l)x_2(k, l) + n_1(k, l) \quad \text{Equation 26}$$

-continued $$y_2(k, l) = h_{21}(k, l)x_1(k, l) + h_{22}(k, l)x_2(k, l) + n_2(k, l) \quad \text{Equation 27}$$

Accordingly, four channel elements may need to be estimated from two received signal samples. To estimate the channel element $h_{11}$, the interference term related to the second symbol should be removed from $y_1(k,l)$ as shown below in Equation 28:

$$\tilde{y}_{11}(k, l) = y_1(k, l) = \hat{h}_{12}(k, l)\hat{x}_2(k, l) \quad \text{Equation 28}$$

where $\hat{h}_{12}(k,l)$ is an estimate of $h_{12}(k,l)$ (either from the previous SIC iteration or from the 14 previous OFDM symbols). The reconstructed channel may be determined based on Equation 29:

$$\hat{h}_{11,R(k,l)} = \frac{\tilde{y}_{11}(k, l)}{\hat{x}_1(k, l)} \quad \text{Equation 29}$$

Frequency domain smoothing may be performed similar to the single-layer case (e.g., step 303 in FIG. 3), and a smoothed estimate $\hat{h}_{11,S}(k,l)$ may be obtained. Finally, IIR or Kalman filtering may be performed as shown below in Equation 30 (IIR filtering) and Equation 31 (Kalman filtering):

$$\hat{h}_{11}(k, l) = \alpha \hat{h}_{11,S}(k, l) + (1 - \alpha)\hat{h}_{11}(k, l - 1) \quad \text{Equation 30}$$

$$\hat{h}_{11}(k, l) = K(k, l)\hat{h}_{11,S}(k, l) + (1 - K(k, l))f\hat{h}_{11}(k, l - 1) \quad \text{Equation 31}$$

The above procedure may be repeated for $h_{12}$, $h_{21}$, and $h_{22}$. The order of variables in the SIC scheme may be decided based on the relative symbol power to reduce error propagation when calculating values from one symbol to the next.

Figure 4:
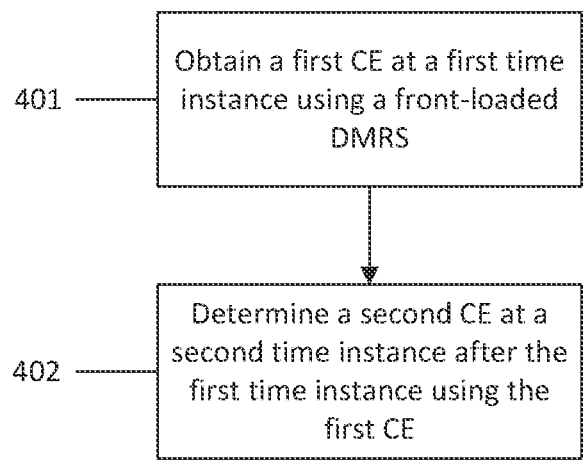
FIG. 4 is a flowchart illustrating performing data-aided channel tracking, according to an embodiment.

FIG. 4 illustrates a flowchart of performing data-aided channel tracking, according to an embodiment.

The data-aided channel tracking method illustrated in FIG. 4 may be performed by the transmitter or receiver 100. In addition, the steps shown may encompass a subroutine that is performed by the controller module 101. Information including the steps shown may be stored on the storage module 102, and the steps may be executed by the controller module 101. In addition, the steps may be similarly performed by the electronic device 501, the processor 520, and the memory 530.

Referring to FIG. 4, a first CE (e.g., a reference CE) is obtained at a first time instance using a front-loaded DMRS at step 201. The first CE may be a CE at any given time instance. For example, referring to FIG. 3, the first CE may be obtained at the $l_1$ time instance. In this sense, a time instance may represent a symbol, since a symbol is encompassed by a period of time. Additionally, multiple symbols may be included in a single slot (e.g., 14 symbols per slot). In addition, the first CE may be obtained using the front-loaded DMRS (e.g., a pilot symbol).

In step 402, a second CE (e.g., a data-aided CE) is determined at a second time instance after the first time instance using the first CE. In this sense, the second CE may be a function of the first CE. Also, since the second CE is a CE for a second time instance that is after the first time instance, then this may refer to the $l_1+1$ time instance (with reference to FIG. 3). Additionally, determining the second CE using the first CE may include some or all of the steps 301-304 shown in FIG. 3. The first CE may be provided as input to the symbol detection step in 301, and may be used to generate an output that is provided to the channel reconstruction step 302 which, in turn, provides an output to the FD smoothing step 303, which provides an output to the IIR/KF step 304 to determine a second CE.

The steps shown in FIG. 4 may be iteratively performed such that the first time instance may be $l_1$ (or $l_1+1$), and the second time instance may be $l_1+1$ (or $l_1+2$) (with reference to FIG. 3). In addition, due to the recursive nature of the data-aided channel tracking technique, one or more additional data-aided CEs may be sequentially determined for one or more time instances subsequent to the second time instance, based on a data-aided CE obtained at a previous time instance and based on the received data symbols. The data-aided CE obtained at a previous time instance may be, for example, the data-aided CE obtained at the second time instance or one of the one or more additional data-aided CEs.

In addition, the method should not be limited to the forward direction. In some cases, the second CE may be for a time instance prior to the first time instance, particularly if a small amount of latency is acceptable (e.g., when there is less than a predetermined amount of latency).

Figure 5:
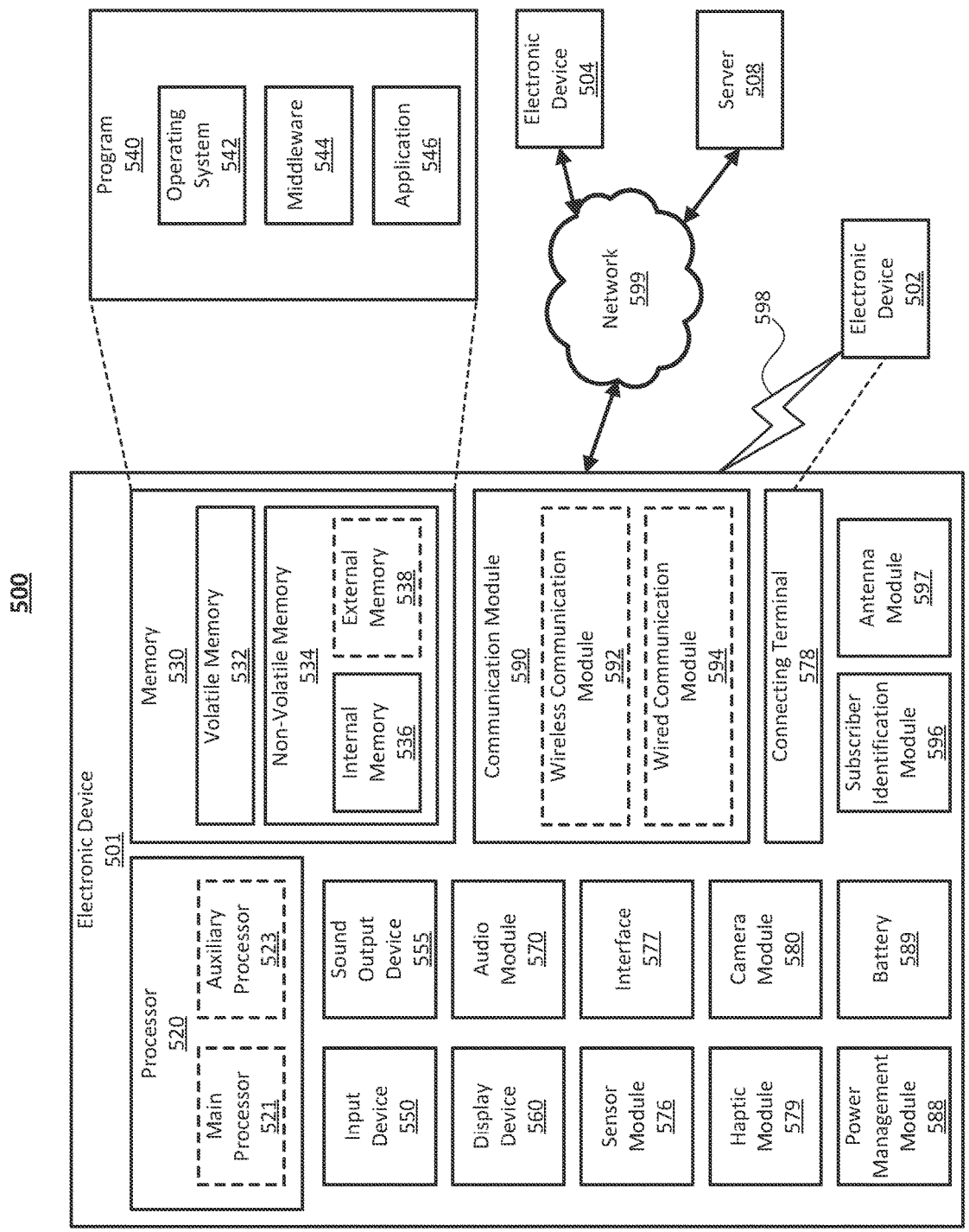
FIG. 5 is a block diagram of an electronic device in a network environment, according to an embodiment.

FIG. 5 is a block diagram of an electronic device in a network environment, according to an embodiment.

Referring to FIG. 5, an electronic device 501 in a network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may include a processor 520, a memory 530, an input device 540, a sound output device 555, a display device 560, an audio module 570, a sensor module 576, an interface 577, a haptic module 579, a camera module 580, a power management module 588, a battery 589, a communication module 590, a subscriber identification module (SIM) card 596, or an antenna module 594. In one embodiment, at least one (e.g., the display device 560 or the camera module 580) of the components may be omitted from the electronic device 501, or one or more other components may be added to the electronic device 501. Some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute software (e.g., a program 540) to control at least one other component (e.g., a hardware or a software component) of the electronic device 501 coupled with the processor 520 and may perform various data processing or computations.

As at least part of the data processing or computations, the processor 520 may load a command or data received from another component (e.g., the sensor module 546 or the communication module 590) in volatile memory 532, process the command or the data stored in the volatile memory 532, and store resulting data in non-volatile memory 534. The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). The auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. The display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. The audio module 570 may obtain the sound via the input device 550 or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. The interface 577 may include, for example, a high-definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. The connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. The haptic module 579 may include, for example, a motor, a piezoelectric element, or an electrical stimulator.

The camera module 580 may capture a still image or moving images. The camera module 580 may include one or more lenses, image sensors, image signal processors, or flashes. The power management module 588 may manage power supplied to the electronic device 501. The power management module 588 may be implemented as at least part of, for example, a power management integrated circuit (PMIC).

The battery 589 may supply power to at least one component of the electronic device 501. The battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. The communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. The antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

Commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Additionally or alternatively, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method of performing data-aided channel tracking for a subcarrier, comprising:
   obtaining a reference channel estimate (CE) at a first time instance using a reference signal;
   determining, based on the obtained reference CE and based on received data symbols, a data-aided CE at a second time instance that is subsequent to the first time instance; and
   sequentially determining one or more additional data-aided CEs, for one or more time instances subsequent to the second time instance, based on a data-aided CE obtained at a previous time instance and based on the received data symbols,
   wherein at least one of the data-aided CE or the one or more additional data-aided CEs is determined without using the reference signal directly.

2. The method of claim 1, further comprising:
   performing symbol detection using the reference CE to obtain a symbol detection result, wherein the data-aided CE at the second time instance is determined using the symbol detection result.

3. The method of claim 2, further comprising:
performing channel reconstruction using the symbol detection result to obtain a channel reconstruction result,
wherein the data-aided CE at the second time instance is determined using the channel reconstruction result.

4. The method of claim 3, further comprising:
performing smoothing using the channel reconstruction result to obtain a smoothing result,
wherein the data-aided CE at the second time instance is determined using the smoothing result.

5. The method of claim 4, further comprising:
performing filtering using the smoothing result to obtain a filtering result,
wherein the data-aided CE at the second time instance is determined using the filtering result.

6. The method of claim 5, wherein performing filtering comprises:
determining a first coefficient applied to an estimate obtained at a first symbol index;
determining a second coefficient applied to an estimate obtained at a second symbol index; and
multiplying the first coefficient by the reference CE and the second coefficient by the data-aided CE at the second time instance.

7. The method of claim 4, wherein performing smoothing comprises:
determining frequency domain (FD)-minimum mean squared error (MMSE) coefficients using the subcarrier and at least one neighboring subcarrier.

8. The method of claim 1, further comprising:
determining another CE at a third time instance before the first time instance using the reference CE.

9. The method of claim 1, wherein the data-aided channel tracking is applied recursively to determine the one or more additional data-aided CEs at multiple successive time instances.

10. The method of claim 1, further comprising:
determining the data-aided CE at the second time instance for a different layer using a successive interference cancellation (SIC) scheme.

11. An electronic device, comprising:
at least one processor; and
at least one memory operatively connected with the at least one processor, the at least one memory storing instructions, which when executed, instruct the at least one processor to perform a method of performing data-aided channel tracking for a subcarrier, by:
obtaining a reference channel estimate (CE) at a first time instance using a reference signal;
determining, based on the obtained reference CE and based on received data symbols, a data-aided CE at a second time instance that is subsequent to the first time instance; and
sequentially determining one or more additional data-aided CEs, for one or more time instances subsequent to the second time instance, based on a data-aided CE obtained at a previous time instance and based on the received data symbols,
wherein at least one of the data-aided CE or the one or more additional data-aided CEs is determined without using the reference signal directly.

12. The electronic device of claim 11, wherein the processor is further instructed to:
perform symbol detection using the reference CE to obtain a symbol detection result,
wherein the data-aided CE at the second time instance is determined using the symbol detection result.

13. The electronic device of claim 12, wherein the processor is further instructed to:
perform channel reconstruction using the symbol detection result to obtain a channel reconstruction result,
wherein the data-aided CE at the second time instance is determined using the channel reconstruction result.

14. The electronic device of claim 13, wherein the processor is further instructed to:
perform smoothing using the channel reconstruction result to obtain a smoothing result,
wherein the data-aided CE at the second time instance is determined using the smoothing result.

15. The electronic device of claim 14, wherein the processor is further instructed to:
perform filtering using the smoothing result to obtain a filtering result,
wherein the data-aided CE at the second time instance is determined using the filtering result.

16. The electronic device of claim 15, wherein performing filtering comprises:
determining a first coefficient applied to an estimate obtained at a first symbol index;
determining a second coefficient applied to an estimate obtained at a second symbol index; and
multiplying the first coefficient by the reference CE and the second coefficient by the data-aided CE at the second time instance.

17. The electronic device of claim 14, wherein performing smoothing comprises:
determining frequency domain (FD)-minimum mean squared error (MMSE) coefficients using the subcarrier and at least one neighboring subcarrier.

18. The electronic device of claim 11, wherein the processor is further instructed to:
determine another CE at a third time instance before the first time instance using the reference CE.

19. The electronic device of claim 11, wherein the data-aided channel tracking is applied recursively to determine the one or more additional data-aided CEs at multiple successive time instances.

20. The electronic device of claim 11, wherein the processor is further instructed to:
determine the data-aided CE at the second time instance for a different layer using a successive interference cancellation (SIC) scheme.

* * * * *